United States Patent
Tsai et al.

(10) Patent No.: US 11,826,825 B2
(45) Date of Patent: Nov. 28, 2023

(54) PARAMETER ANALYSIS METHOD AND PARAMETER ANALYSIS SYSTEM FOR METAL ADDITIVE MANUFACTURING

(71) Applicant: Industrial Technology Research Institute, Hsinchu (TW)

(72) Inventors: Tsung-Wen Tsai, New Taipei (TW); Wai-Kwuen Choong, Tainan (TW); Tzong-Ming Wu, Taipei (TW); Ji-Bin Horng, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 259 days.

(21) Appl. No.: 17/385,892

(22) Filed: Jul. 26, 2021

(65) Prior Publication Data

US 2022/0161329 A1    May 26, 2022

(30) Foreign Application Priority Data

Nov. 26, 2020    (TW) .................................. 109141555

(51) Int. Cl.
*B22F 10/85* (2021.01)
*G05B 13/04* (2006.01)
(Continued)

(52) U.S. Cl.
CPC ............ *B22F 10/85* (2021.01); *B23K 26/342* (2015.10); *G05B 13/042* (2013.01); *B33Y 50/00* (2014.12)

(58) Field of Classification Search
CPC ......... B22F 10/85; B33Y 50/00; B33Y 10/00; B23K 26/342; G05B 13/042
See application file for complete search history.

(56) References Cited

U.S. PATENT DOCUMENTS

| 10,589,377 B2 | 3/2020 | Vorontsov |
| 2011/0061591 A1 | 3/2011 | Stecker |

(Continued)

FOREIGN PATENT DOCUMENTS

| CN | 105389435 | 3/2016 |
| CN | 106383968 | 2/2017 |

(Continued)

OTHER PUBLICATIONS

Haijun Gong, et al., "Melt Pool Characterization for Selective Laser Melting of Ti—6Al—4V Pre-alloyed Powder", 25th Annual International Solid Freeform Fabrication Symposium, Aug. 2014, pp. 256-267.

(Continued)

*Primary Examiner* — Michael P Wieczorek
(74) *Attorney, Agent, or Firm* — JCIPRNET (57) ABSTRACT

A parameter analysis method and a parameter analysis system for metal additive manufacturing are provided. The parameter analysis method includes: establishing a powder bed model; simulating a multi-track melting result of the powder bed model according to a plurality of laser parameters to generate a melting model; analyzing the melting model to calculate a plurality of position divergences of a plurality of melting powders of the melting model, and defining a plurality of melting surface powders according to the position divergences; analyzing the melting surface powders to calculate a surface average curvature of the melting model; and determining a laser hatch in the laser parameters allows metal additive manufacturing to meet a quality as needed according to whether the surface average curvature is between a first curvature threshold and a second curvature threshold, the first curvature threshold being smaller than the second curvature threshold.

18 Claims, 5 Drawing Sheets

(51) Int. Cl.
  *B23K 26/342* (2014.01)
  *B33Y 50/00* (2015.01)

(56) References Cited

U.S. PATENT DOCUMENTS

| | | | |
|---|---|---|---|
| 2014/0249773 | A1 | 9/2014 | Beuth, Jr. |
| 2015/0286757 | A1 | 10/2015 | Yao |
| 2019/0193159 | A1 | 6/2019 | Gibson et al. |
| 2020/0047286 | A1* | 2/2020 | Cheng ............... B29C 64/393 |
| 2020/0198230 | A1* | 6/2020 | Lo ............... B33Y 50/02 |

FOREIGN PATENT DOCUMENTS

| | | |
|---|---|---|
| CN | 107368642 | 11/2017 |
| TW | 201726363 | 8/2017 |
| TW | 201809933 | 3/2018 |
| TW | I639817 | 11/2018 |
| TW | I642536 | 12/2018 |

OTHER PUBLICATIONS

A.V. Gusarov, et al., "Thermoelastic residual stresses and deformations at laser treatment", Physics Procedia vol. 41, 2013, pp. 896-903.

Saad A. Khairallah, et al., "Mesoscopic simulation model of selective laser melting of stainless steel powder", Journal of Materials Processing Technology vol. 214, Jun. 1, 2014, pp. 2627-2636.

Manyalibo J. Matthews, et al., "Denudation of metal powder layers in laser powder bed fusion processes", Acta Materialia vol. 114, May 9, 2016, pp. 33-42.

Alexander M. Rausch, et al., "Predictive Simulation of Process Windows for Powder Bed Fusion Additive Manufacturing: Influence of the Powder Bulk Density", Materials, Sep. 20, 2017, pp. 1-14.

Ibiye Aseibichin Roberts, "Investigation of Residual Stresses in the Laser Melting of Metal Powders in Additive Layer Manufacturing", A thesis of University of Wolverhampton for the degree of Doctor of Philosophy, Sep. 2012, pp. 1-246.

Igor Yadroitsev, et al., "Factor analysis of selective laser melting process parameters and geometrical characteristics of synthesized single tracks", Rapid Prototyping Journal, vol. 18, No. 3, Jun. 29, 2011, pp. 201-208.

Xinran Zhao, et al., "Numerical modeling of the thermal behavior and residual stress in the direct metal laser sintering process of titanium alloy products", Additive Manufacturing vol. 14, Mar. 2017, pp. 126-136.

M. Necati Ã-Zisik, et al., "Section 1.8 heat condition equation", Heat Conduction, Wiley, 1993, p. 1.

S. Kakac, et al., "Section 2.3 momentum equations", Convective Heat Transfer, CRC Press, 1995, pp. 27-32.

Office Action of Taiwan Counterpart Application, dated Feb. 7, 2022, pp. 1-6.

* cited by examiner

PARAMETER ANALYSIS METHOD AND PARAMETER ANALYSIS SYSTEM FOR METAL ADDITIVE MANUFACTURING

CROSS-REFERENCE TO RELATED APPLICATION

This application claims the priority benefit of Taiwan application no. 109141555, filed on Nov. 26, 2020. The entirety of the above-mentioned patent application is hereby incorporated by reference herein and made a part of this specification.

TECHNICAL FIELD

The disclosure relates to a parameter analysis technique, and particularly relates to a parameter analysis method and a parameter analysis system for metal additive manufacturing.

BACKGROUND

Through the development of manufacturing techniques, metal additive manufacturing has emerged as a key aspect in additive manufacturing. However, in the conventional metal additive manufacturing, when metal powder is subjected to laser, the melting behavior of the metal powder involves multiple complicated physical coupling effects. Therefore, it is difficult for the user to have a grasp of suitable manufacturing parameters for metal additive manufacturing. In addition, if the manufacturing parameters are not controlled properly, the quality of the product manufactured through metal additive manufacturing may be poor. Regarding this, the conventional way is to conduct experiments repetitively to learn and improve the parameters through the trial-and-error process. However, when facing various newly developed materials, specialized equipment modules, or novel manufacturing processes, such a trial-and-error process is costly and inefficient. Therefore, further efforts are still needed.

SUMMARY

A parameter analysis method for metal additive manufacturing according to an aspect of the disclosure includes: establishing a powder bed model; simulating a multi-track melting result of the powder bed model according to a plurality of laser parameters to generate a melting model; analyzing the melting model to calculate a plurality of position divergences of a plurality of melting powders of the melting model, and defining a plurality of melting surface powders according to the position divergences; analyzing the plurality of melting surface powders to calculate a surface average curvature of the melting model; and determining whether a choice on a laser hatch in the laser parameters allows metal additive manufacturing to meet a quality as needed according to whether the surface average curvature is between a first curvature threshold and a second curvature threshold. The first curvature threshold is smaller than the second curvature threshold.

A parameter analysis system according to another aspect of the disclosure is adapted for a parameter analysis for metal additive manufacturing. The parameter analysis system includes a memory and a processor. The memory is configured to store a parameter analysis module. The processor is coupled to the memory. The processor is configured to execute the parameter analysis module to perform the following. The processor establishes a powder bed model and simulates a multi-track melting result of the powder bed model according to a plurality of laser parameters to generate a melting model. The processor analyzes the melting model to calculate a plurality of position divergences of a plurality of melting powders of the melting model and defines a plurality of melting surface powders according to the position divergences. The processor analyzes the melting surface powders to calculate a surface average curvature of the melting model and determines whether a choice on a laser hatch in the laser parameters allows metal additive manufacturing to meet a quality as needed according to whether the surface average curvature is between a first curvature threshold and a second curvature threshold. The first curvature threshold is smaller than the second curvature threshold.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

In order to make the disclosure more comprehensible, embodiments are described below as the examples to show the disclosure Moreover, where possible, elements/components/steps with same reference numerals represent same or similar parts in the drawings and embodiments.

The disclosure provides a parameter analysis method and a parameter analysis system for metal additive manufacturing, capable of performing simulation and analysis by using a plurality of laser parameters for metal additive manufacturing. With the parameter analysis method and system, the laser parameters can be efficiently analyzed to determine whether the laser parameters chosen for analysis allows the metal additive manufacturing to meet the quality as needed.

Based on the above, in the parameter analysis method and the parameter analysis system according to the embodiments of the disclosure, the multi-track melting result of the powder bed model may be simulated according to the laser parameters, and the surface curvature of the melting model of the simulation result thereof is analyzed to determine whether the consistency of the simulated melting surface is appropriate, so as to efficiently analyze whether the laser hatch in the laser parameters is appropriate. Accordingly, the manufacturing product manufactured through the metal additive manufacturing adopting the laser hatch setting can meet the quality as needed.

Figure 1:
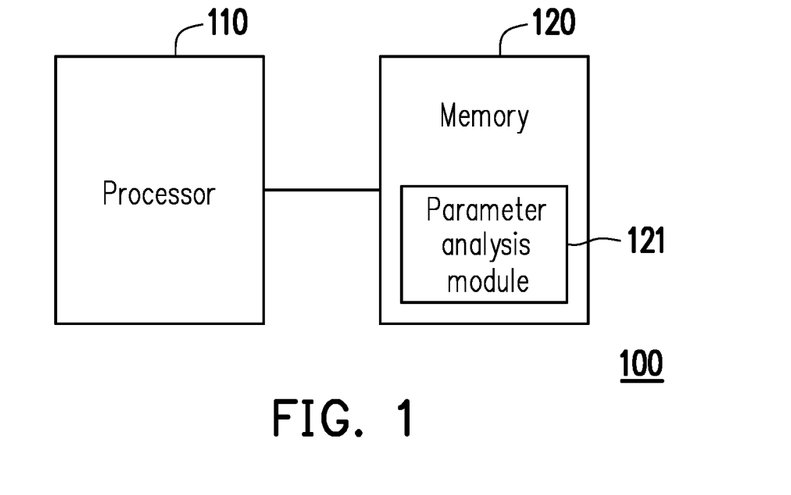
FIG. 1 is schematic diagram illustrating a parameter analysis system according to an embodiment of the disclosure.

FIG. 1 is schematic diagram illustrating a parameter analysis system according to an embodiment of the disclosure. Referring to FIG. 1, a parameter analysis system 100 includes a processor 110 and a memory 120. The processor 110 is coupled to the memory 120. The memory 120 includes a parameter analysis module 121. In the embodiment, the parameter analysis system 100 may be an electronic device, such as a personal computer (PC), a notebook computer, an industrial PC (IPC), or a cloud server, etc., or a similar apparatus, digital system, or cloud platform. The parameter analysis system 100 may also be installed, as software, to the above equipment for the user to operate to automatically execute relevant simulation and analysis operations provided in the respective embodiments of the disclosure and thereby realize the parameter analysis of the metal additive manufacturing described in the respective embodiments of the disclosure.

In the embodiment, the processor 110 may be, for example, a central processing unit (CPU), or other programmable general-purpose or special-purpose microprocessors, digital signal processors (DSPs), programmable controllers, application specific integrated circuits (ASICs), programmable logic devices (PLDs), programmable logic devices (PLDs), other similar processing devices, or a combination of these devices. The memory 120 may be a dynamic random access memory (DRAM), a flash memory, or a non-volatile random access memory (NVRAM), etc.

In the embodiment, the parameter analysis module 121 may be, for example, a software application program at least capable of performing simulation and analysis. The parameter analysis module 121 may be stored in advance in the memory 120, and data such as parameter data, powder bed models, and melting models, etc., to be described in the respective embodiments may be loaded to or stored in the memory 120 for the processor 110 to access and execute these data. In an embodiment, the parameter analysis module 121 may also be stored in a non-transitory computer readable storage medium, and the parameter analysis to be described in the respective embodiments of the disclosure may be realized by loading the parameter analysis module 121 into an electronic device.

In the embodiment, the processor 110 may execute the parameter analysis module 121 to perform a laser multi-track melting analysis and a multi-layer powder melting analysis for metal additive manufacturing. The analyses main serve for analyzing the influences of parameters, such as different laser hatches and powder layer thicknesses (multiple layers of powder), etc., on melting quality. The processor 110 may firstly establish a powder bed model to simulate a real situation of metal additive manufacturing in which a plurality of metal powders are distributed on a substrate. In an embodiment, the metal powder may be, for example, stainless steel or a titanium alloy. However, the disclosure is not particularly limited by the material type of the metal powder. Specifically, the processor 110 may simulate a melting model, which simulates a melting result of a plurality of melting powders after a plurality of (metal) powders on the powder bed model are melt, under the condition of a plurality of laser parameters of different laser beams.

Regarding this, during the simulation, the thermal conduction behavior of the (metal) powders after being melt may be described according to the thermal conduction formula described in "M. Necati Ozisik (1993) Heat Conduction". The thermal conduction formula is as represented in Formula (1) below, wherein a parameter $\rho$ represents the density (kg/m$^3$), a parameter $c_p$ represents the specific heat (J/kg·K), a parameter k represents the thermal conduction coefficient (W/m·K), and a parameter T represents the temperature (K). The parameter $q_{laser}$ represents the laser heat source term, and may be expressed in Formula (2) below, wherein a parameter R represents the reflexivity, a parameter P represents the laser power (W), a parameter $r_0$ represents the laser light spot radius, a parameter x represents the position parameter (m) of a Cartesian coordinate system, and a parameter $v_s$ represents the laser scanning speed (m/s).

$$\rho c_p\left(\frac{\partial T}{\partial t}\right) = \nabla \cdot k \nabla T + q_{laser} \quad \text{Formula (1)}$$

$$q_{laser} = \frac{(1-R)P}{\pi r_0^2} e^{-2\left(\frac{x}{r_0}\right)^2} e^{-2\left(\frac{v_s t - 2r_0}{r_0}\right)^2} \quad \text{Formula (2)}$$

In addition, after the laser heats the powder over the melting point, the processor 110 may start calculating and analyzing a melt pool fluid behavior. As expressed in Formulae (3) to (7) below, the analysis for the melt pool fluid behavior may be carried out based on the Navier-Stoke equation in "Kakac & Yener (1995) Convective Heat Transfer". In the disclosure, the analysis also takes surface tension, gravity, etc., into consideration. In Formulae (3) to (7) in the following, a parameter $\rho$ represents the density (kg/m$^3$), parameters u and v represent the fluid velocities (m/s) in X and Y directions, a parameter t represents the time (s), a parameter p represents the pressure (Pa), a parameter $\tau$ represents the shear stress (Pa), and a parameter $\mu$ represents the viscosity coefficient (Pa·s).

$$\frac{Du}{Dt} = \frac{1}{\rho}\left(-\frac{\partial p}{\partial x} + \frac{\partial \tau_{11}}{\partial x} + \frac{\partial \tau_{12}}{\partial y}\right) + f_x \quad \text{Formula (3)}$$

$$\frac{Dv}{Dt} = \frac{1}{\rho}\left(-\frac{\partial p}{\partial y} + \frac{\partial \tau_{12}}{\partial x} + \frac{\partial \tau_{22}}{\partial y}\right) + f_z + g_z \quad \text{Formula (4)}$$

$$\tau_{11} = \mu\left\{\frac{\partial u}{\partial x} - \frac{2}{3}(\nabla \cdot V)\right\} \quad \text{Formula (5)}$$

$$\tau_{22} = \mu\left\{\frac{\partial v}{\partial y} - \frac{2}{3}(\nabla \cdot V)\right\} \quad \text{Formula (6)}$$

$$\tau_{12} = \mu\frac{1}{2}\left\{\frac{\partial v}{\partial x} + \frac{\partial u}{\partial y}\right\} \quad \text{Formula (7)}$$

In the embodiment, during the simulation, when the laser stops heating and the temperature of the powder is cooled off below the melting point, the processor 110 stops the melt pool fluid behavior analysis. Then, the processor 110 may perform a multi-track melting analysis on the melting model to analyze whether the choice on the laser hatch in the laser parameters allows the metal additive manufacturing to reach the quality as needed. In addition, the processor 110 may perform a multi-layer powder analysis on the melting model to analyze whether at least one of the laser scanning speed and the laser power in the laser parameters also allows the metal additive manufacturing to meet the quality as needed. It should be noted that, during the simulation analysis process of the parameter analysis actually carried out by the system, the multi-track melting analysis and the multi-layer powder melting analysis proposed in the disclosure may be separately and independently carried out. Besides, it is also possible to firstly carry out the multi-track melting analysis and then the multi-layer powder analysis. The disclosure is not particularly limited by the order in which the multi-track melting analysis and the multi-layer powder analysis are carried out.

Figure 2:
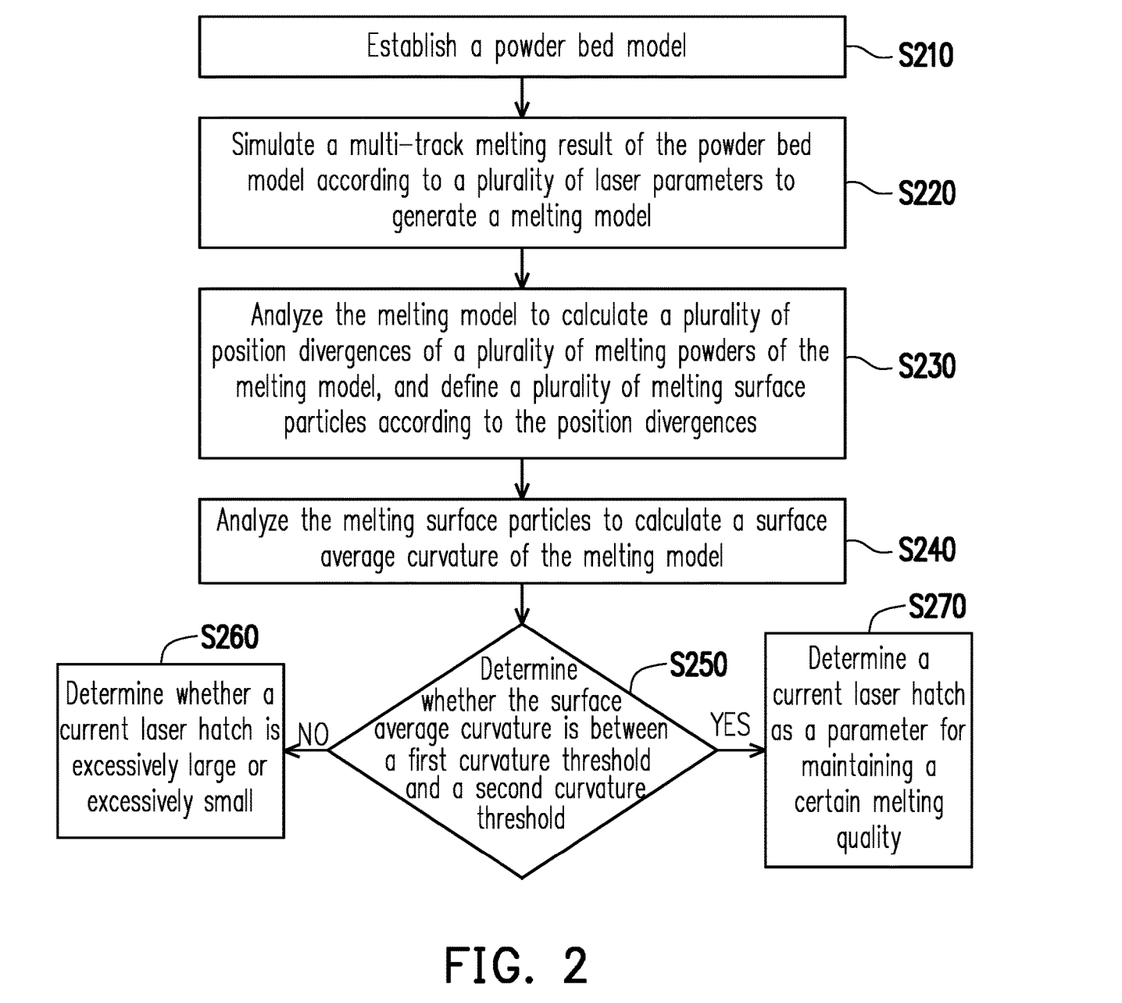
FIG. 2 is a flowchart illustrating a multi-track melting analysis of a parameter analysis method according to an embodiment of the disclosure.
Figure 4:
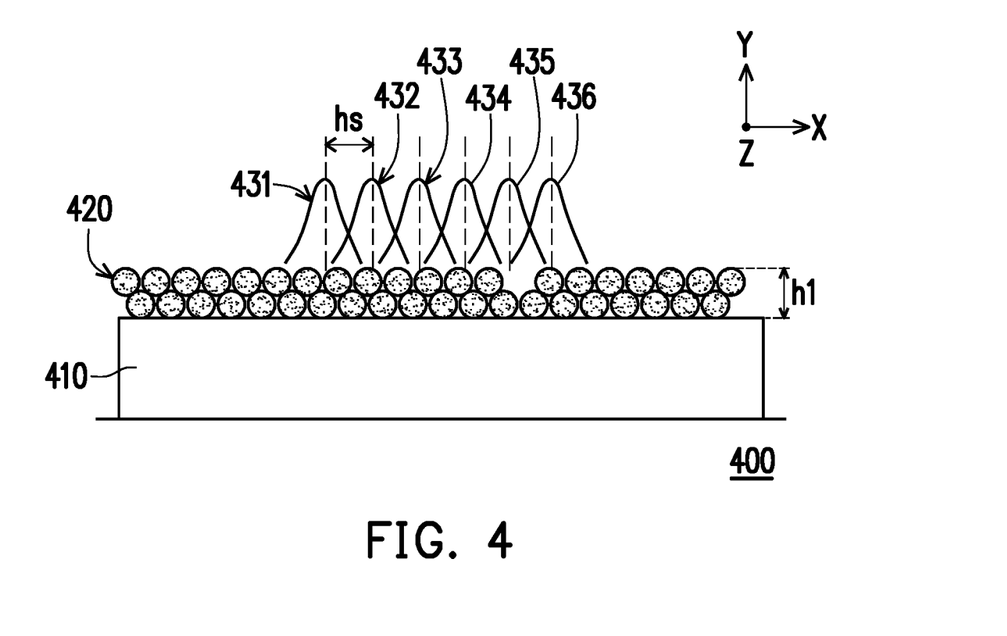
FIG. 4 is schematic view illustrating a powder bed model according to an embodiment of the disclosure.

FIG. 2 is a flowchart illustrating a multi-track melting analysis of a parameter analysis method according to an embodiment of the disclosure. Referring to FIGS. 1 and 2, the parameter analysis system 100 may execute Steps S210 to S270 to carry out the multi-track melting analysis. In Step S210, the processor 110 may establish the powder bed model. Referring to FIG. 4, FIG. 4 is a schematic view illustrating a powder bed model according to an embodiment of the disclosure. In the embodiment, the processor 110 may establish a powder med model 400 as shown in FIG. 4. The powder bed model 400 may be a three-dimensional model, and the powder bed model 400 includes a substrate 410 and a plurality of powders 420 which are distributed on the substrate 410 and of which powder diameters are randomly distributed. The substrate 410 extend along the X direction and the Z direction, and the powders 420 are distributed on the substrate 410 and stacked along the Y direction (such as a multi-layer structure), the X, Y and Z direction being perpendicular to each other. The substrate 410 is formed of a metal material same as that of the powders, or may be regarded as a structure formed by melting powders after the previous layer is melt in the multi-layer structure. In the embodiment, the powder bed model 400 is a dual-layer powder stacked structure. However, the disclosure is not limited thereto. In an embodiment, the powder bed model 400 may be a single-layer powder stacked structure or a multi-layer powder stacked structure. In addition, the powder bed model 400 may also be a two-dimensional model (arranged along the X direction and the Y direction).

Figure 5A:
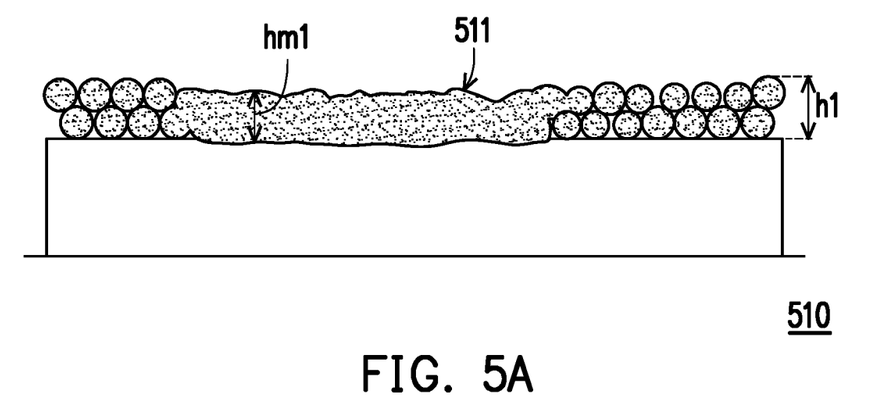
FIG. 5A is schematic view illustrating a melting model according to an embodiment of the disclosure.
Figure 5B:
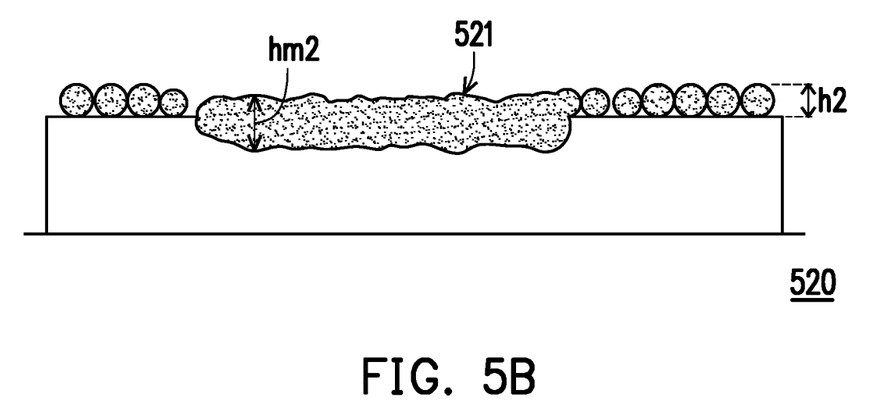
FIG. 5B is schematic view illustrating a melting model according to another embodiment of the disclosure.

In Step S220, the processor 110 may simulate a multi-track melting result of the powder bed model 400 according to the laser parameters, so as to generate a melting model. As shown in FIG. 4, the processor 110 may, for example, set a laser hatch hs, a laser scanning speed, and a laser power, and simulate that laser beams perform melting along six melting paths 431 to 436 along the Z direction at a fixed laser scanning speed as well as a fixed laser power. In addition, the melting paths 431 to 436 are spaced apart at the fixed laser hatch hs. Referring to FIG. 5A, FIG. 5A is a schematic view illustrating a melting model according to an embodiment of the disclosure. After the multi-track melting simulation, the processor 110 may generate a melting model 510 as shown in FIG. 5A. In addition, FIG. 5B is schematic view illustrating a melting model according to another embodiment of the disclosure. Referring to FIG. 5B, if the powder bed model 400 established by the processor 110 is a single-layer powder structure, after the multi-track melting simulation, the processor 110 may generate a melting model 520 as shown in FIG. 5B.

At Step S230, the processor 110 may analyze the melting model 510 to calculate a plurality of position divergences of the melting powders of the melting model 510, and define a plurality of melting surface powders according to the position divergences. Regarding this, the processor 110 may calculate the position divergence $\nabla \cdot \vec{r}$ of each melting powder according to Formula (8) below, wherein $m_j$ represents the mass, $\rho_j$ represents the density, and $\nabla W_{ij}$ is a derivative of a weight function. The processor 110 may effectively determine whether each melting powder is a melting surface powder according to the condition of Formula (9) below. When the position divergence of a melting powder is less than a parameter ε, the melting powder is defined as a melting surface powder, wherein the parameter ε may be 0.47, for example.

$$\nabla \cdot \vec{r} = \sum_{j=1}^{N} \vec{r}_{ij} \cdot \frac{m_j \nabla W_{ij}}{\rho j} \qquad \text{Formula (8)}$$

$$|\nabla \cdot \vec{r}| \le \varepsilon \qquad \text{Formula (9)}$$

Regarding this, after the melting surface powders are defined, in Step S240, the processor 110 may analyze the melting surface powders to calculate the surface average curvature of the melting model 510. As shown in FIG. 5A, the processor 110 may analyze a surface 511 formed by the melting surface powders of the melting model 510, and calculate a surface average curvature $K_a$ of the surface 511 (the unit of which is a reciprocal of length), wherein parameters x and y are the position parameters of the X direction and the Y direction.

$$\kappa_a(x) = \frac{y''(x)}{(1 + y'(x)^2)^{3/2}} \qquad \text{Formula 10)}$$

In Step S250, as in Formula (11) below, the processor 110 may determine whether the surface average curvature $K_a$ is between a first curvature threshold $\eta_1$ and a second curvature threshold $\eta_2$. If not, the surface average curvature $K_a$ is less than the first curvature threshold $\eta_1$ or greater than the second curvature threshold $\eta_2$. Therefore, the processor 110 executes Step S260. In Step S260, the processor 110 may determine whether the current laser hatch is excessively large or small. If yes, the surface average curvature $K_a$ is between the first curvature threshold $\eta_1$ and the second surface threshold $\eta_2$. Therefore, the processor 110 executes Step S270. In Step S270, the processor 110 may determine that the current laser hatch is a processing parameter which maintains a certain melting quality. In other words, if the additive manufacturing is to be performed by using the current laser hatch, it is expected that an additively manufactured structure whose consistency is as needed may be obtained, and the metal additive manufacturing meets the quality as needed without forming an excessively large pore in the additively manufactured structure. Therefore, the parameter analysis system 100 may effectively optimize the parameter of laser hatch according to the flow of the embodiment of the disclosure.

$$\eta_1 < \kappa_a < \eta_2 \qquad \text{Formula (11)}$$

For example, the processor 110 may respectively set different laser hatches hs to perform the multi-track melting analysis on the powder bed model 400. In the example, a layer thickness h1 of the powder bed model 400 is fixed, and the powder material is 316L stainless steel, the laser scanning speed is 1.5 m/s, and the laser power is 180 watts (W). Therefore, through multiple times of the simulation and analysis operation as described in Steps S210 to S270, the processor 110 may obtain the laser hatches hs of the parameter data table of Table 1 below. In addition, the processor 110 may further calculate the corresponding overlapping rate and consistency (calculation). The processor 110 may, for example, perform calculation according to Formula (12) and Formula (13) to obtain a corresponding overlapping rate OR (%) and a corresponding consistency (calculation) CO (%). In Formula (12) below, a parameter hs represents the laser hatch, and a parameter w represents the melt pool width. In Formula (13) in the following, a parameter $\rho_{sub}$ represents the substrate density of the substrate 410 shown in FIG. 4, and a parameter $\rho_{melting}$ represents the density of the melting region, as shown in FIG. 5A or 5B, after the powders 420 shown in FIG. 4 are melt.

$$OR(\%) = \left(1 - \frac{h_s}{w}\right) \times 100\% \quad \text{Formula (12)}$$

$$CO(\%) = \left(\frac{\rho_{sub} - \rho_{melting}}{\rho_{sub}}\right) \times 100\% \quad \text{Formula (13)}$$

Then, the determination criterion as Formula (11) may be set in default in the processor 110, wherein the first curvature threshold $\eta_1$ may be set as 32150, and the second curvature threshold $\eta_2$ may be set as 35000, so as to analyze and indicate that the multi-track simulation result performed under the condition that the laser hatch hs is 70 um and the consistency thereof (calculation) are favored. Also, in this example, the actual consistency (measurement) that is measured and the consistency (calculation) obtained through the simulation and analysis performed by the parameter analysis system 100 are similar, suggesting that the simulation of the parameter analysis system 100 is reliable.

TABLE 1

| hs (um) | Overlapping rate | $\kappa_a$ | Consistency (calculation) | Consistency (measurement) |
|---|---|---|---|---|
| 60 um | 81.1% | 32150 | 99.3% | 99.47% |
| 70 um | 7.55% | 34943 | 99.12% | 99.72% |
| 80 um | −5.66% | 38326 | 98.99% | 99.05% |
| 90 um | −1.89% | 42137 | 97.86% | 98.75% |

In another example, the powder material is Ti64 titanium alloy, the laser scanning speed is 1.25 m/s, and the laser power is 180 W. Therefore, through multiple times of the simulation and analysis operation as described in Steps S210 to S270, the processor 110 may obtain the laser hatches hs of the parameter data table of Table 2 below. In addition, the processor 110 may further calculate the overlapping rate and the consistency (calculation) according to Formula (12) and Formula (13). The determination criterion as Formula (11) may be set in default in the processor 110, wherein the first curvature threshold $\eta_1$ may be set as 9200, and the second curvature threshold $\eta_2$ may be set as 9900, so as to analyze and indicate that the multi-track simulation result performed under the condition that the laser hatch hs is 70 um and the consistency thereof (calculation) are favored. Similarly, in this example, the actual consistency (measurement) that is measured and the consistency (calculation) obtained through the simulation and analysis performed by the parameter analysis system 100 are similar, suggesting that the simulation of the parameter analysis system 100 is reliable.

TABLE 2

| hs (um) | Overlapping rate | $\kappa_a$ | Consistency (calculation) | Consistency (measurement) |
|---|---|---|---|---|
| 60 | 33.3% | 9214 | 98.46% | 98.98% |
| 70 | 22.2% | 9946 | 98.08% | 98.41% |
| 80 | 11.1% | 12503 | 97.98% | 98.01% |

Figure 3:
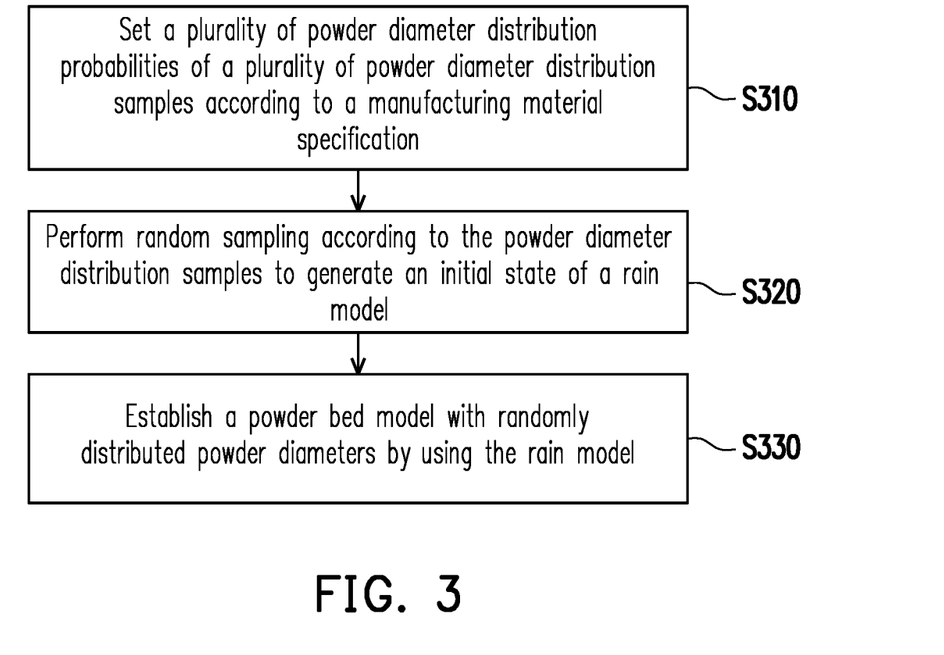
FIG. 3 is flowchart illustrating establishing a powder bed model according to an embodiment of the disclosure.

FIG. 3 is flowchart illustrating establishing a powder bed model according to an embodiment of the disclosure. Referring to FIGS. 1 and 3, the parameter analysis system 100 may execute Steps S310 to S330 to generate the powder bed model. The flow of the embodiment may be regarded as a detailed embodiment corresponding to Step S210 (establishing a powder bed model) of FIG. 2. At Step S310, the processor 110 may set a plurality of powder diameter distribution probabilities of a plurality of powder diameter distribution samples according to a manufacturing material specification. The powder diameter distribution probabilities may satisfy Formula (14) below, wherein the average of the powder mean diameter may be 30 um, for example, and the standard deviation σ may be 2, for example.

$$f(x) = \frac{1}{\sigma\sqrt{2\pi}} e^{-\frac{(x-\mu)^2}{2\sigma^2}} \quad \text{Formula (14)}$$

Therefore, the processor 110 may compile a parameter data table as Table 3 below, for example, according to the powder diameter distribution probabilities.

TABLE 3

| Powder diameter μ | Distribution probability f (x) |
|---|---|
| 20 um | 0% |
| 21 um | 0% |
| 22 um | 0.01% |
| 23 um | 0.04% |
| 24 um | 0.22% |
| 25 um | 0.88% |
| 26 um | 2.7% |
| 27 um | 6.48% |
| 28 um | 12.1% |
| 29 um | 17.6% |
| 30 um | 19.95% |
| 31 um | 17.6% |
| 32 um | 12.1% |
| 33 um | 6.48% |
| 34 um | 2.7% |
| 35 um | 0.88% |
| 36 um | 0.22% |
| 37 um | 0.04% |
| 38 um | 0.01% |
| 39 um | 0% |
| 40 um | 0% |

In Step S320, the processor 110 may perform random sampling according to the powder diameter distribution samples of Table 3 to generate the initial state of a falling ball model. In Step S330, the processor 110 may use the rain model to establish the dual-layer powder bed model with randomly distributed powder diameters as shown in FIG. 4 or other single-layer or multi-layer powder bed model. Therefore, the processor 110 uses a mixed powder diameter rain model to establish the powder bed model with randomly distributed powder diameters of the disclosure.

Figure 6:
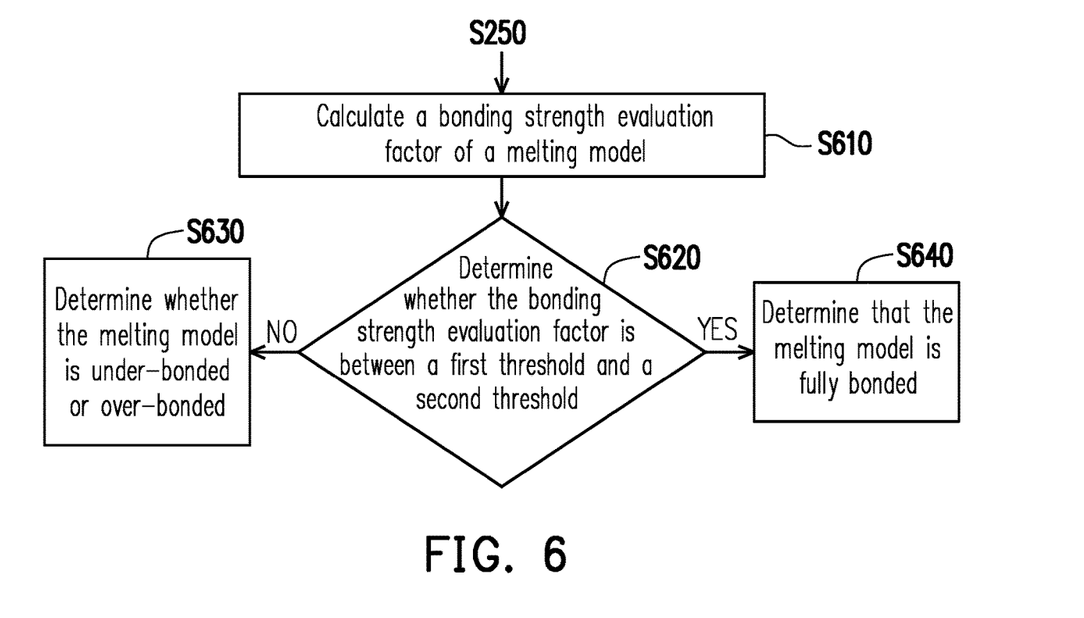
FIG. 6 is a flowchart illustrating a multi-layer powder analysis of a parameter analysis method according to an embodiment of the disclosure.

FIG. 6 is a flowchart illustrating an analysis of a parameter analysis method according to an embodiment of the disclosure in the multi-layer powder. Referring to FIGS. 1 and 6, the parameter analysis system 100 may execute Steps S610 to S640 to carry out the multi-layer powder analysis. The processor 110 may execute Steps S610 to S640 described below following Step S250 of the multi-track melting analysis of FIG. 2. However, the disclosure is not limited thereto. In an embodiment, Steps S610 to S640 of the multi-layer powder analysis may be carried out independently or before the multi-track melting analysis. In Step S610, the processor 110 may calculate a bonding strength evaluation factor J of the melting model. The bonding strength evaluation factor J may be obtained according to Formula (15) below, wherein a parameter hm represents the melting depth, and a parameter h represents the (powder) layer thickness. The bonding strength evaluation factor J is obtained by dividing the melting thickness hm of the melting model by the powder layer thickness h. The melting depth hm may be the average melting depth or the maximum melting depth of the melting model, and the melting depth hm may include melting powders after being melt and a portion of the substrate that is correspondingly melt.

$$J = \frac{hm}{h} \quad \text{Formula (15)}$$

In Step S620, the processor 110 may determine whether the bonding strength evaluation factor J is between a first threshold J1 and a second threshold J2 according to the condition of Formula (16) below. The first threshold J1 may be 1.5, for example, and the second threshold J2 may be 2.06, for example. If the bonding strength evaluation factor J is not between the first threshold J1 and the second threshold J2, the processor 110 may execute Step 630 to determine whether the melting model is under-bonded (J<J1) or over-bonded (J>J2). If the bonding strength evaluation factor J is between the first threshold J1 and the second threshold J2, the processor 110 may execute Step 640 to determine that the melting model is fully bonded. Therefore, the processor 110 may determine whether the powders and the substrate are properly bonded after being melt according to the calculation result of the bonding strength evaluation factor J of the multi-layer powder analysis, so as to effectively choose at least one of the effective laser scanning speed and the effective laser power in the laser parameters.

$$J1 > J \geq J2 \quad \text{Formula (16)}$$

Referring to FIG. 5A together with Table 4 below as an example, the melting model 510 may be a multi-layer (e.g., dual-layer) powder stacked structure. A (powder) layer thickness h1 of the melting model 510 may be 60 um, and a melting depth hm1 is 50.2 um. Therefore, the processor 110 may execute the calculation according to Formula (13) above and obtain the bonding strength evaluation factor J as 0.8. Regarding this, the consistency (calculation) of the melting model 510 may be 86.54%, and the actual consistency (measurement) is 87.175%. In other words, the melting model 510 of FIG. 5A is under-bonded (J<J1). Thus, the user may refer to the simulation result to adjust (optimize) manufacturing parameters, such as reducing the laser scanning speed or increasing the laser power.

Then, referring to FIG. 5B together with Table 4 below as another example, the melting model 520 may be a single-layer powder stacked structure, and a (powder) layer thickness h2 of the melting model 520 may be 30 um, and a melting depth hm2 is 61.8 um. Therefore, the processor 110 may execute the calculation according to Formula (13) above and obtain the bonding strength evaluation factor J as 2.06. Regarding this, the consistency (calculation) of the melting model 520 may be 99.9%, and the actual consistency (measurement) is 99.94%. In other words, the melting model 520 of FIG. 5B is fully bonded (J1<J≤J2). Thus, the user may refer to the simulation result to adjust (optimize) manufacturing parameters, such as increasing the laser scanning speed or reducing the laser power.

TABLE 4

| (powder) layer thickness | Melting depth | Bonding strength evaluation factor J | Consistency (calculation) | Consistency (measurement) |
|---|---|---|---|---|
| h1 = 60 um | hm1 = 50.2 um | 0.8 W | 86.54% | 87.175% |
| h2 = 30 um | hm2 = 61.8 um | 2.06 W | 99.90% | 99.94% |

For example, the (powder) layer thickness h1 of the melting model 510 of FIG. 5A may be 60 um. The processor 110 may use different laser scanning speeds (V) and laser powers (P) (while the laser hatch being fixed) to perform melting simulation on the powder bed model 400 of FIG. 4, and respectively execute Steps S610 to S640 to obtain the parameter data table of Table 5 below. The unit of the laser scanning speed (V) is meter (m) per second (m/s). The unit of the laser power (P) is Watt (W). Regarding this, as shown in Table 5 below, none of the bonding strength evaluation factors J fall between the first threshold J1 and the second threshold J2, and all of them are lower than the first threshold J1, which suggest that the bonding strengths are not favorable (i.e., reduced consistencies). Therefore, the user may evaluate and adjust the laser scanning speed (V) and the laser power (P) according to Table 5 below provided by the parameter analysis system 100 to effectively optimize the layer thickness parameter. In addition, as shown in Table 5, the parameter analysis system 100 may respectively provide the bonding strength evaluation factors J and the consistencies (calculation) $\rho_s$ (%) of the respective simulation results for the user's reference.

TABLE 5

| V/P | 180 | 200 | 300 | 400 | 500 |
|---|---|---|---|---|---|
| 1000 | N/A | J = 0.931 $\rho_S$ = 91.96 | J = 0.965 $\rho_S$ = 92.89 | J = 1.023 $\rho_S$ = 94.14 | J = 1.081 $\rho_S$ = 94.96 |
| 1200 | N/A | J = 0.925 $\rho_S$ = 91.03 | J = 0.943 $\rho_S$ = 91.73 | J = 0.925 $\rho_S$ = 93.71 | N/A |
| 1500 | J = 0.8 $\rho_S$ = 86.54 | N/A | N/A | N/A | N/A |

Figure 7:
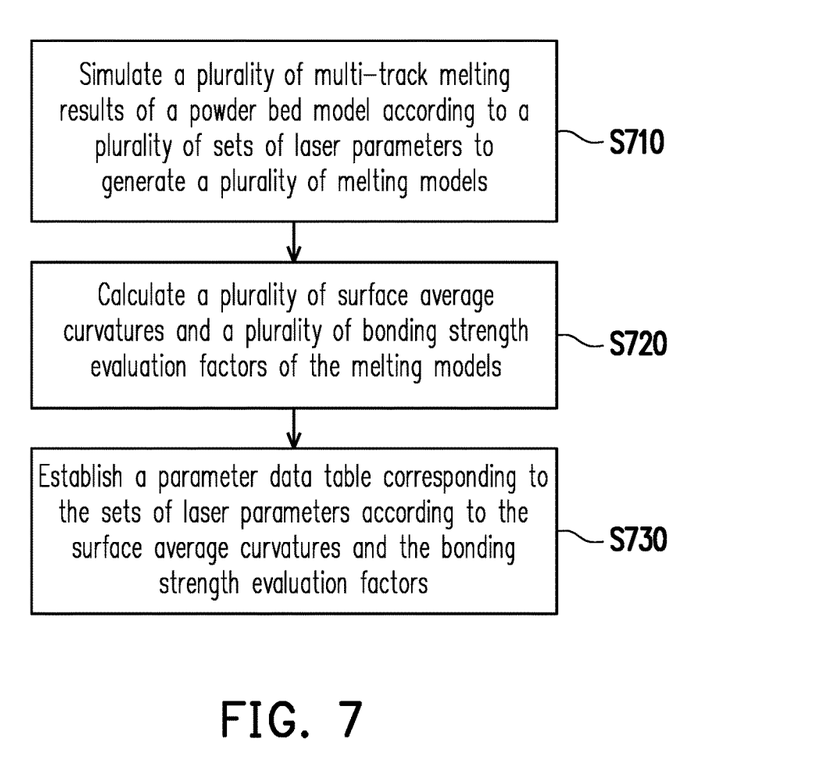
FIG. 7 is flowchart illustrating establishing a parameter data table according to an embodiment of the disclosure.

FIG. 7 is flowchart illustrating establishing a parameter data table according to an embodiment of the disclosure. Referring to FIGS. 1 and 7, the parameter analysis system 100 may execute Steps S710 to S730 to establish the parameter data table. In Step S710, the processor 110 may simulate a plurality of multi-track melting results of the powder bed model according to a plurality of sets of laser parameters to generate a plurality of melting models. Regarding this, the processor 110 may execute Steps S210 and S220 in the embodiment of FIG. 2 to generate the melting models. In Step S720, the processor 110 may calculate the surface average curvatures and the bonding strength evaluation factors of the melting models. Regarding this, the processor 110 may respectively execute the multi-track melting analysis on the melting models according to Steps S230 to S270 in the embodiment of FIG. 2 to evaluate whether the laser hatches respectively corresponding to the melting models are applicable. In addition, the processor 110 may respectively execute the multi-layer powder melting analysis on the melting models according to Steps S610 to S640 of the embodiment of FIG. 6 to evaluate whether the laser scanning speeds and the laser intensities of the melting models respectively corresponding to different layer thicknesses allow the metal additive manufacturing adopting the chosen manufacturing parameters to meet the quality as needed. In Step S730, the processor 110 may establish the parameter data table corresponding to the sets of laser parameters according to the surface average curvatures and the bonding strength evaluation factors. Regarding this, the information and the formats presented in the parameter data table may be integrative, such as having the information of the parameters and the format of the data table of at least one of Tables 1, 2, 4, and 5 above. The disclosure is not particularly limited in this regard. Therefore, the parameter analysis system 100 of the embodiment is capable of effectively performing a simulation analysis on the laser parameters for metal additive manufacturing. Therefore, the user may quickly optimize the manufacturing parameters for metal additive manufacturing.

Based on the above, in the parameter analysis method and the parameter analysis system for metal additive manufacturing according to the embodiments of the disclosure, the multi-track melting result of the powder bed model may be simulated according to the laser parameters, and at least one of the multi-track melting analysis and the multi-layer melting analysis is performed, so as to quickly analyze and evaluate whether at least one of the laser hatch, the laser scanning speed, and the laser intensity in the laser parameters meets the quality as needed. Accordingly, the user may effectively optimize the manufacturing parameters for metal additive manufacturing.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A parameter analysis method for metal additive manufacturing, comprising:
    establishing a powder bed model;
    simulating a multi-track melting result of the powder bed model according to a plurality of laser parameters to generate a melting model;
    analyzing the melting model to calculate a plurality of position divergences of a plurality of melting powders of the melting model, and defining a plurality of melting surface powders according to the position divergences;
    analyzing the melting surface powders to calculate a surface average curvature of the melting model; and
    determining whether a choice on a laser hatch in the laser parameters allows metal additive manufacturing to meet a quality as needed according to whether the surface average curvature is between a first curvature threshold and a second curvature threshold, wherein the first curvature threshold is smaller than the second curvature threshold.

2. The parameter analysis method as claimed in claim 1, wherein establishing the powder bed model comprises:
    setting a plurality of powder diameter distribution probabilities of a plurality of powder diameter distribution samples according to a manufacturing material specification;
    randomly sampling according to the powder diameter distribution samples to generate an initial state of a rain model; and
    establishing the powder bed model with randomly distributed powder diameters by using the rain model.

3. The parameter analysis method as claimed in claim 1, wherein the powder bed model is a three-dimensional model and comprises a substrate and a plurality of powders which are distributed on the substrate and of which powder diameters are randomly distributed.

4. The parameter analysis method as claimed in claim 1, wherein the powder bed model is a single-layer powder stacked structure or a multi-layer powder stacked structure.

5. The parameter analysis method as claimed in claim 1, wherein simulating the multi-track melting result of the powder bed model to generate the melting model comprises:
    simulating multi-track melting of a laser on the powder bed model along a plurality of melting paths in a first direction, wherein the melting paths are parallel to each other on a substrate of the powder bed model and spaced apart from each other by the laser hatch.

6. The parameter analysis method as claimed in claim 1, further comprising:
    calculating a bonding strength evaluation factor of the melting model when the laser hatch is determined as applicable; and
    determining whether the melting model renders a fully bonded result according to whether the bonding strength evaluation factor is between a first threshold and a second threshold, wherein the first threshold is smaller than the second threshold.

7. The parameter analysis method as claimed in claim 6, wherein the bonding strength evaluation factor is a melting depth of the melting model divided by a powder layer thickness.

8. The parameter analysis method as claimed in claim 6, wherein the laser parameters further comprise a laser scanning speed and a laser power.

9. The parameter analysis method as claimed in claim 6, further comprising:
    simulating a plurality of multi-track melting results of the powder bed model according to a plurality of sets of laser parameters to generate a plurality of melting models;
    calculating a plurality of surface average curvatures and a plurality of bonding strength evaluation factors of the melting models; and
    establishing a parameter data table corresponding to the sets of laser parameters according to the surface average curvatures and the bonding strength evaluation factors.

10. A parameter analysis system, adapted for a parameter analysis for metal additive manufacturing, wherein the parameter analysis system comprises:
    a memory, configured to store a parameter analysis module; and
    a processor, coupled to the memory and configured to execute the parameter analysis module, wherein, by executing the parameter analysis module,
    the processor establishes a powder bed model and simulates a multi-track melting result of the powder bed model according to a plurality of laser parameters to generate a melting model, the processor analyzes the melting model to calculate a plurality of position divergences of a plurality of melting powders of the melting model and defines a plurality of melting surface powders according to the position divergences, the processor analyzes the melting surface powders to calculate a surface average curvature of the melting model and determines whether a choice on a laser hatch in the laser parameters allows metal additive manufacturing to meet a quality as needed according to whether the surface average curvature is between a first curvature threshold and a second curvature threshold, wherein the first curvature threshold is smaller than the second curvature threshold.

11. The parameter analysis system as claimed in claim 10, wherein the processor sets a plurality of powder diameter distribution probabilities of a plurality of powder diameter distribution samples according to a manufacturing material specification, randomly samples according to the powder diameter distribution samples to generate an initial state of a rain model, and establishes the powder bed model with randomly distributed powder diameters by using the rain model.

12. The parameter analysis system as claimed in claim 10, wherein the powder bed model is a three-dimensional model and comprises a substrate and a plurality of powders which are distributed on the substrate and of which powder diameters are randomly distributed.

13. The parameter analysis system as claimed in claim 10, wherein the powder bed model is a single-layer powder stacked structure or a multi-layer powder stacked structure.

14. The parameter analysis system as claimed in claim 10, wherein the processor simulates multi-track melting of a laser on the powder bed model along a plurality of melting paths in a first direction, wherein the melting paths are parallel to each other on a substrate of the powder bed model and spaced apart from each other by the laser hatch.

15. The parameter analysis system as claimed in claim 10, wherein when determining that the laser hatch is applicable, the processor further calculates a bonding strength evaluation factor of the melting model, and the processor determines whether the melting model renders a fully bonded result according to whether the bonding strength evaluation factor is between a first threshold and a second threshold, wherein the first threshold is smaller than the second threshold.

16. The parameter analysis system as claimed in claim 15, wherein the bonding strength evaluation factor is a melting depth of the melting model divided by a powder layer thickness.

17. The parameter analysis system as claimed in claim 15, wherein the laser parameters further comprises a laser scanning speed and a laser power.

18. The parameter analysis system as claimed in claim 15, wherein the processor simulates a plurality of multi-track melting results of the powder bed model according to a plurality of sets of laser parameters to generate a plurality of melting models, and the processor calculates a plurality of surface average curvatures and a plurality of bonding strength evaluation factors of the melting models, wherein the processor establishes a parameter data table corresponding to the sets of laser parameters according to the surface average curvatures and the bonding strength evaluation factors.

* * * * *